United States Patent [19]

Flasck

[11] Patent Number: 5,022,750

[45] Date of Patent: Jun. 11, 1991

[54] ACTIVE MATRIX REFLECTIVE PROJECTION SYSTEM

[75] Inventor: Richard A. Flasck, San Ramon, Calif.

[73] Assignee: RAF Electronics Corp., San Ramon, Calif.

[21] Appl. No.: 392,746

[22] Filed: Aug. 11, 1989

[51] Int. Cl.[5] .......................... G02F 1/13; G03B 21/00
[52] U.S. Cl. ......................................... 353/31; 353/34; 353/30; 353/81; 353/84; 350/333; 350/286
[58] Field of Search ........................ 353/34, 33, 31, 30, 353/32, 82, 122, 37, 81, 84, 94; 350/96.15, 96.19, 96.18, 96.2, 286, 339 F, 333

[56] References Cited

U.S. PATENT DOCUMENTS

| | | | |
|---|---|---|---|
| 3,525,566 | 8/1970 | Altman | 353/66 |
| 3,862,360 | 1/1975 | Dill et al. | 178/7.3 D |
| 4,103,297 | 7/1978 | McGreivy et al. | 349/324 M |
| 4,239,346 | 12/1980 | Lloyd | 350/334 |
| 4,368,963 | 1/1983 | Stolov | 353/31 |
| 4,716,403 | 12/1987 | Morozumi | 350/339 F |
| 4,749,259 | 6/1988 | Ledebuhr | 353/33 |
| 4,826,311 | 5/1989 | Ledebuhr | 353/33 |
| 4,838,654 | 6/1989 | Hamaguchi | 350/333 |

*Primary Examiner*—William A. Cuchlinski, Jr.
*Assistant Examiner*—William C. Dowling
*Attorney, Agent, or Firm*—Leydig, Voit & Mayer

[57] ABSTRACT

An active matrix reflective projection system utilizing a conventional wafer includes a reflective image plane module. The reflective image plane module includes light directing and reflecting structures and a wafer based active matrix mated thereto. A source of light is directed to the reflective image plane module wherein the wafer based active matrix imparts information onto a light beam reflected therefrom. The reflective image plane module projects the reflected beam for viewing, such as through one or more lens. The active matrix reflective projection system can be a monochrome projector including a single reflective image plane module or can be a full color system including three reflective image plane modules. Each color reflective image plane module operates on a single color component, red, green or blue, which then are combined on a screen or before projecting on the screen to form the full color projection image. The wafer based active matrix includes a specular reflective back surface and an LC or similar type material formed thereon which is electronically altered to impart the information to the light beam reflected therefrom. The LC material preferably is a solid light modulating material having bodies of LC material suspended in the solid material. The reflective image plane module includes a prism or mirror which passes the light or light component through a first surface to the wafer based active matrix mated to a second surface and which projects the reflected light from the first surface to be viewed.

55 Claims, 8 Drawing Sheets

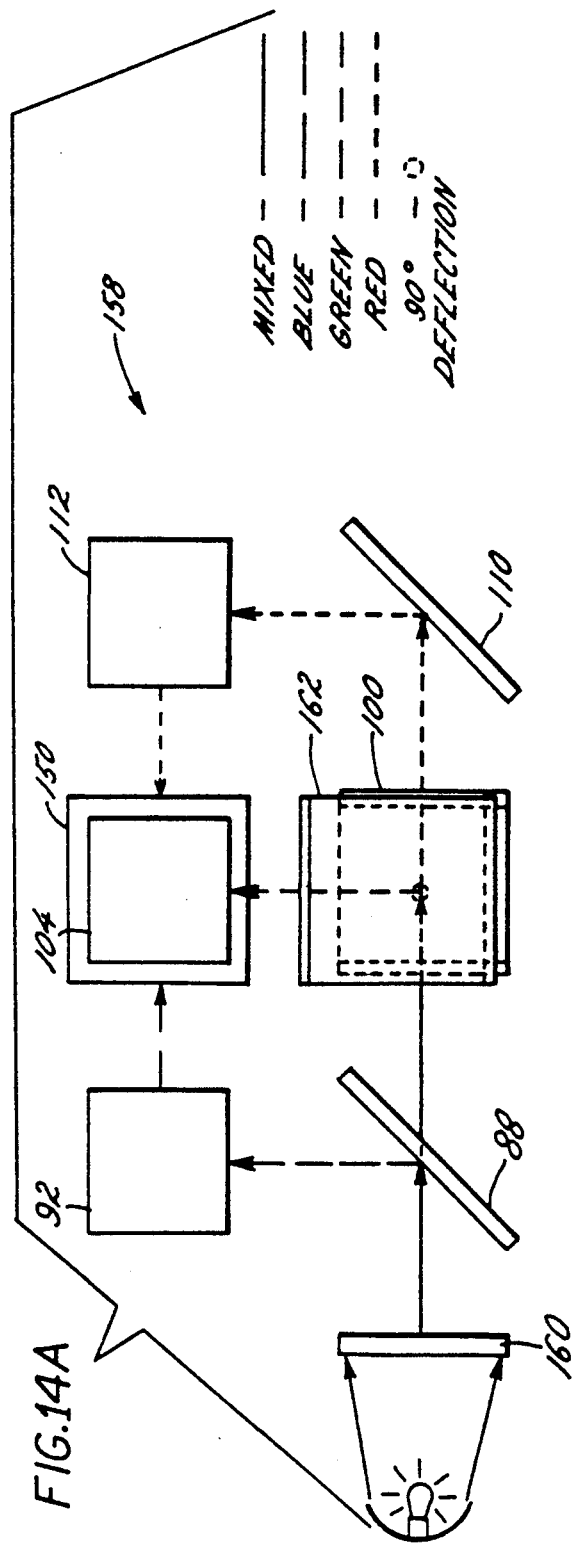
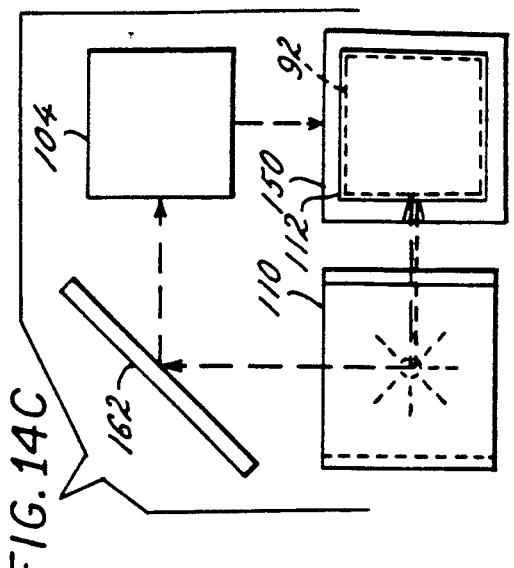
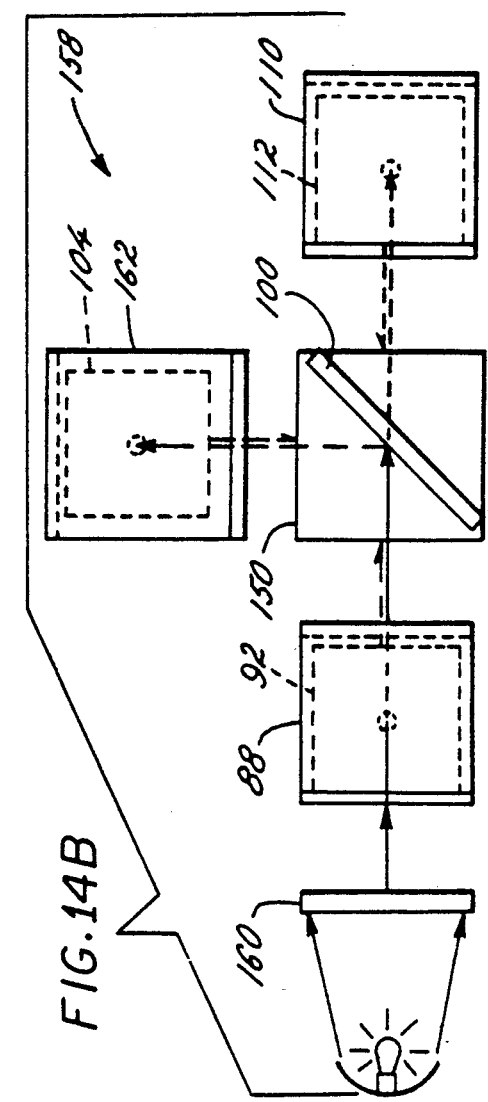
FIG.14A
FIG.14B
FIG.14C

ACTIVE MATRIX REFLECTIVE PROJECTION SYSTEM

BACKGROUND OF THE INVENTION

The invention relates generally to projection systems and more particulary to an active matrix reflective projection system.

During the last two decades, there have been numerous efforts to develop and commercialize flat panel displays to effectively compete with the conventional cathode ray tube (CRT) or to develop products which are not possible utilizing CRT's. Of these efforts, plasma display panels (PDP), electroluminescent displays (EL) and several types of liquid crystal displays (LCD) have clearly been the most successful and have exhibited the most dynamic growth and future potential. One specific type of display, active matrix liquid crystal displays (AMLCD), has demonstrated sufficient performance to address some major market segments.

The cost of AMLCD's is largely determined by the yield of useable devices, where the yield is the percentage of useable devices from the total produced. Yield of AMLCD's is in large part determined by the device design, manufacturing process tolerance and the display size. In general, the larger the display size, the lower the yield and hence higher the cost of the device.

The focus of efforts in recent years has been in developing direct view display sizes large enough to replace existing TV and computer monitors. Pocket TV's have been introduced having one to three inch wide display screens, with the expressed goal of producing larger displays as volume and yield increase. An intense effort is being made to produce a fourteen inch diagonal or larger display. The ultimate goal of some efforts is to produce wall size direct view displays for the TV market. This goal is very likely to be frustrated by the inherent obstacles in producing a CRT or any other type of direct view display of that size.

The AMLCD effort has concentrated on utilizing a matrix of nonlinear devices on a glass or fused silica substrate. The nonlinear devices allow individual control over each display picture element or "pixel" to provide superior optimal performance. The nonlinear devices generally are amorphous or polycrystalline silicon thin film transistors (TFT); however, thin film diodes (TFD) and metal-insulator-metal (MIM) devices also have been employed.

A transparent substrate is considered necessary for these displays, because most liquid crystal (LC) materials require a polarizer at both the front and the back of the LCD device. Further, the conventional position on color displays is that they must be transmissive rather than reflective, because of the light losses inherent in the color reflective mode.

In developing larger size displays, substrate cost becomes important. Amorphous silicon TFT AMLCD's utilize inexpensive drawn glass. Polycrystalline silicon on the other hand, requires either very high temperature glass or fused silica substrates. Either of these substrates is prohibitively expensive in widths over eight inches. The inexpensive amorphous silicon AMLCD substrates are offset by the fact that these displays require separate address devices which result in several hundred interconnections to the display substrate. Polycrystalline silicon AMLCD's allow integration of the addressing circuitry on the substrate which reduces the number of interconnections to a very few.

The first direct view AMLCD utilizing a single crystal silicon wafer was produced in the early 1970's. Work on this development continued into the early 1980's, utilizing standard crystal silicon wafers and wafer fabrication techniques. This work appears to virtually have been abandoned since the display sizes are limited to less than the available wafer size and because the wafers are not transparent. These devices utilized dynamic scattering guest-host or dyed phase change rather than conventional twisted nematic LC material, which required expensive and elaborate photolithography to produce the required diffuse reflective aluminum back surface. These devices do provide fast, high performance and stable displays with integrated address and drive circuitry.

New markets have been recognized which include home theatre high definition TV, audio visual machines and high resolution large area computer aided design (CAD) stations. Each of these markets require very large, high resolution, full color and video speed imaging. In reviewing these markets Applicant has determined that the large area dictates projection systems, either front or rear projection, that the high resolution requires integrated drivers and that projection systems do not require either transparent substrates or large display sizes.

It, therefore, would be desirable to provide an active matrix reflective projection system having high resolution, integrated drivers and manufactured with conventional wafer fabrication techniques.

SUMMARY OF INVENTION

The disadvantages of the prior art displays and techniques are overcome in accordance with the present invention by providing an active matrix reflective projection system utilizing a conventional wafer.

The active matrix reflective projection system includes a reflective image plane module. The reflective image plane module includes a wafer based active matrix mated to a light directing and projecting structure. A source of light is directed to the reflective image plane module wherein the wafer based active matrix imparts or encodes information onto a light beam reflected therefrom. The reflective image plane module light projecting structure projects the reflected beam for viewing, such as through one or more lens.

The active matrix reflective projection system can be a monochrome projector including a reflective image plane module or can be a full color system including three reflective image plane modules. Each color reflective image plane module operates on a single color component, red, green or blue, which then are combined on a screen or before projecting on the screen to form the full color projection image.

The wafer based active matrix includes a specular reflective back surface and an LC or similar characteristic material formed thereon which is electronically altered to impart or encode the information to the light beam reflected therefrom. The LC material preferably is a solid light modulating material having bodies of LC material suspended in the solid material.

The reflective image plane module light directing and projecting structure is formed from a prism or mirror which passes the light or light component through a first surface to the wafer based active matrix mated to a second surface and which projects the reflected light from the first surface to be viewed.

BRIEF DESCRIPTION OF THE DRAWINGS

FIGS. 14A, 14B and 14C are diagrammatic top, front and side views of the projection system of FIG. 13.

DESCRIPTION OF THE PREFERRED EMBODIMENTS

Figure 1:
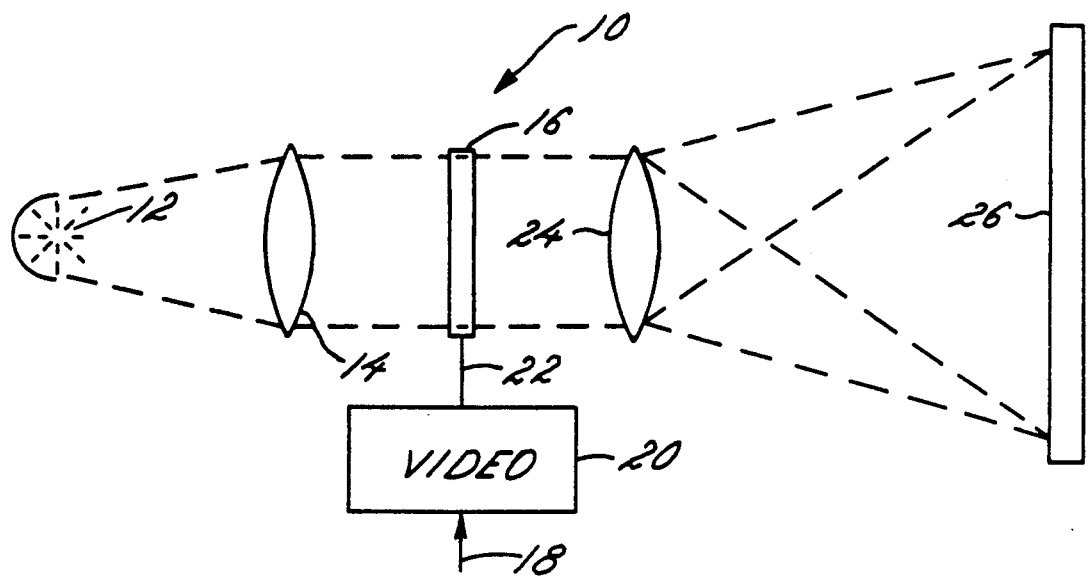
FIG. 1 is a diagrammatic view of a prior art light transmissive projector system.

Referring to FIG. 1, a prior light art light transmissive projection system 10 is illustrated. A light source 12 provides light to a lens or lens system 14, which directs the light to a transmissive LCD 16. A video or computer signal source (not illustrated) is coupled by a line 18 to a video drive circuit 20. The video drive circuit 20 operates on the signal coupled thereto and generates the required drive signals coupled over a line 22 to the LCD 16. Typically the drive signals will be the audio, red video, blue video, green video, vertical sync, horizontal sync, reset and pixel clock signals. The drive signals cause the pixels of the LCD 16 to block or transmit light to impart the required information onto the light transmitted through the LCD 16 to a lens or lens system 24 which projects the composite color picture onto the screen 26. A monochrome projection system would operate in the same manner with only one video light component, rather than the separate blue, green and red video signals.

One prior art transmissive projection system has been developed by Seiko Epson Corp. and utilizes three separate LCD panels, one for each of the blue, green and red video signals. The signals then are combined by a dichroic prism prior to projecting onto the screen. These transmissive projection systems suffer from a number of problems. One significant problem is caused by the construction required by the LC material. The LCD panels include a polarizer on each side of the LC material, such as twisted nematic material, and are utilized as a shutter to absorb the light not to be transmitted. Both the polarizers and the LC material absorb light which generates heat, which is deleterious to the LCD panel. Further, because of the two polarizers, and the LC material utilized, only about fifteen per cent or less of the light directed to the LCD panel is transmitted therethrough for projection to the screen. The devices exhibit low brightness because of the amount of light absorbed.

Further, the resolution of the transmissive panels, typically based upon amorphous silicon deposited active matrix devices, is not as great as that which could be achieved if crystalline based technology was utilized. The pixel density can be made greater by placing the pixel drain pads centered over row and column lines in crystalline devices. Amorphous silicon devices have to leave spaces between pixels for the row and column lines and hence cannot be packed as densely without seriously decreasing the yield.

As mentioned above, deposited amorphous silicon devices have a much greater number of LCD panel interconnects. This decreases reliability and increases cost. These devices are also designed as large area devices which again decreases yield and increases costs.

If polysilicon is utilized to decrease the number of interconnects, other problems occur since the polysilicon transistors are leaky. Therefore, typically these LCD devices utilize two transistors in series at each pixel, which again decreases reliability and increases costs.

Figure 2A:
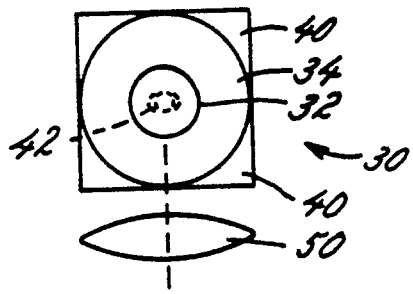
FIGS. 2A, 2B and 2C are diagrammatic top, front and side views of one reflective image plane module embodiment of the present invention.
Figure 2B:
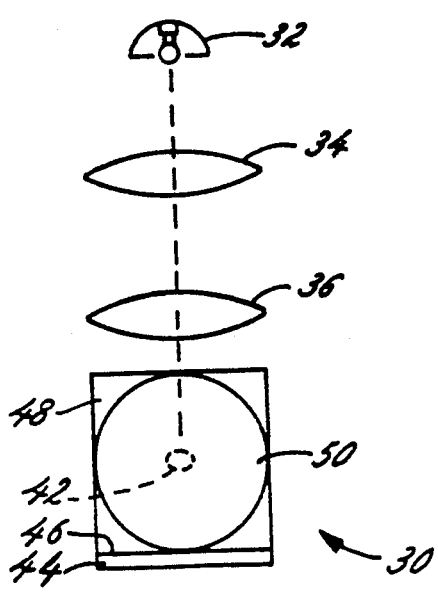
Figure 2C:
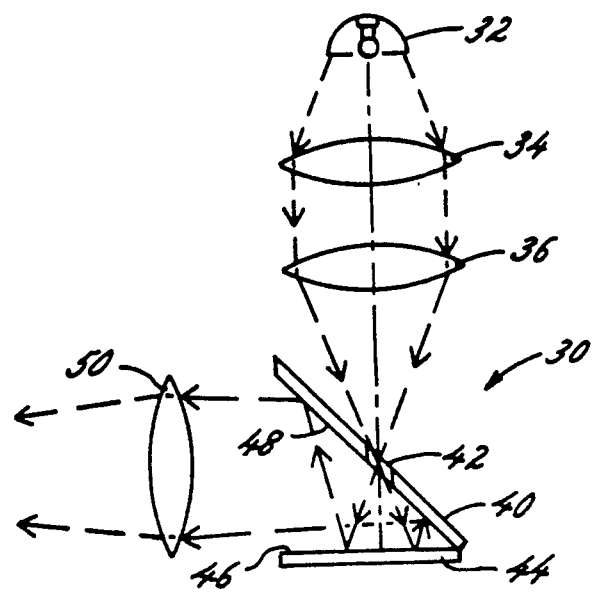

Referring to FIGS. 2A, 2B and 2C, top, front and side views of a first embodiment of a reflective image plane module of the present invention is designated generally by the reference character 30. A light source 32, such as a bulb and a reflector, provides a source of light. The light is columnated by a lens 34 and condensed or focused by a lens 36 to the reflective image plane module 30. The reflective image plane module 30 is further described in Case No. 32041, entitled "REFLECTIVE IMAGE PLANE MODULE", filed concurrently herewith and incorporated herein by reference.

The reflective image plane module 30 includes a first mirrored wall 40 which has an aperture 42 through which the light passes and impinges on a back wall 44 of the reflective image plane module 30. The back wall 44 has attached thereto or is formed of a wafer based active matrix 46. The light has the information imparted to or encoded on it by the wafer based active matrix 46 as it is reflected from the wafer based active matrix 46. One specific example of the wafer based active matrix is further described in Case No. 32042, entitled "WAFER BASED ACTIVE MATRIX", filed concurrently herewith and incorporated herein by reference.

The wafer based active matrix 46 is a wafer based active matrix having a specular reflective back surface to reflect light therefrom. The wafer based active matrix is covered by an LCD or similar characteristic material, such as an electrophoretic material. One preferable LCD material is a solid light modulating material having bodies of LC material suspended therein. Examples of such LCD materials are described in U.S. Pat. No. 4,435,047 and 4,688,900, which are incorporated herein by reference. This LCD material requires higher operating voltage on the order of 12 RMS, which is far more suited to crystalline active matrix devices than to polysilicon or amorphous silicon devices. The crystalline devices also have greater current carrying capacity and faster switching speeds.

The light reflected from the wafer based active matrix 46 is reflected by a mirror back surface 48 of the wall 40. The reflected light from the reflective image plane module 30 is directed to a projection lens 50, which lens or lens system can be a fixed or zoom type lens, and projected by the lens 50 to be viewed, typically on a screen (not illustrated). The reflective image plane module 30 as described can be utilized as a monochrome projection system or can be combined as will be described hereinafter to form a unit of a full color projection system. The reflective image plane module 30 generally only includes the light directing and reflecting structures formed by the elements 40, 42, 44 (including the wafer based active matrix 46) and 48. The reflective image plane module 30 can, however, include the light 32 and other light directing elements 34, 36 and 50 if desired.

Figure 3A:
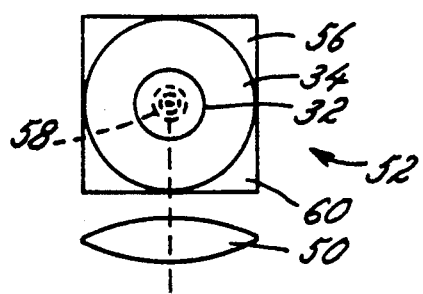
FIGS. 3A, 3B and 3C are diagrammatic top, front, and side views of a second reflective image plane module embodiment of the present invention.
Figure 3B:
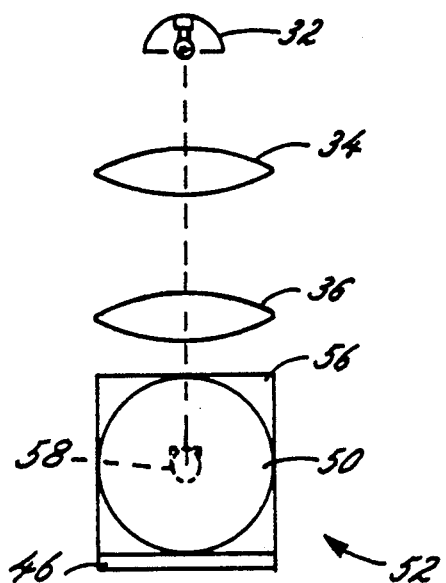
Figure 3C:
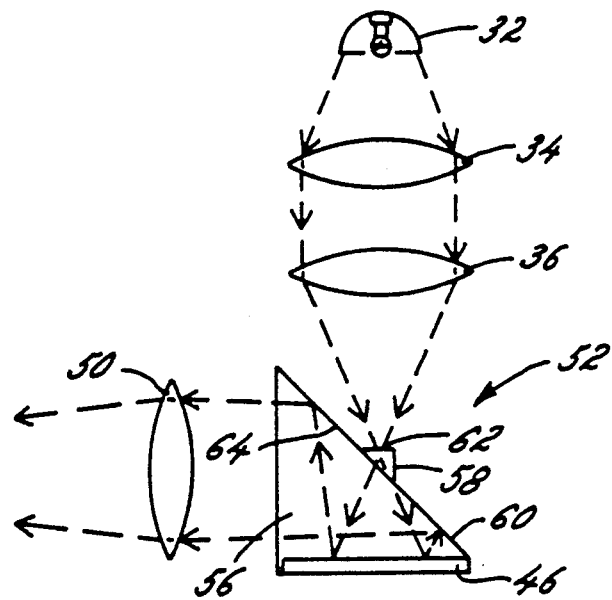

A second embodiment of a reflective image plane module of the present invention is best illustrated in FIGS. 3A-3C, designated generally by the reference character 52. The same or equivalent elements in this or succeeding embodiments will utilize the same numerals as previously described with respect to the reflective image plane module 30. The reflective image plane module 52 functions substantially the same as the reflective image plane module 30, as illustrated in FIG. 3C. The reflective image plane module 52 replaces the mirror 48 with a prism 56. The prism 56 includes a projection 58 formed in a first wall 60 thereof.

The projection 58 includes a light receiving surface 62, through which the light is focused. As before, the light is acted upon and reflected by the wafer based active matrix 46 and again reflected by an inside surface 64 of the wall 60 to the lens 50.

Figure 4A:
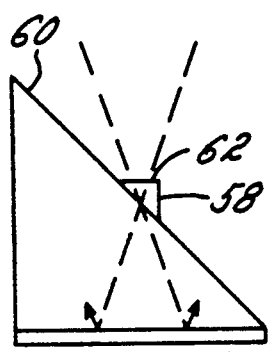
FIGS. 4A, 4B and 4C are partial diagrammatic side views of embodiments of projection surfaces for the reflective, image plane module of FIGS. 3A-3C.
Figure 4B:
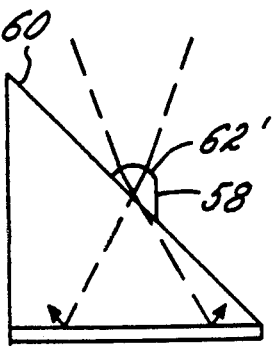
Figure 4C:
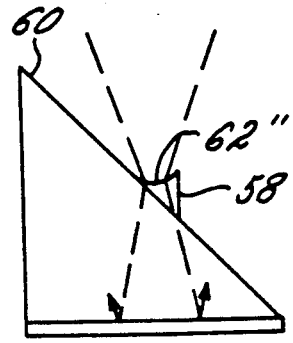

The projection 58 and the surface 62 form another optical element of the reflective image plane module 52. As illustrated in FIGs. 4A-4C, the surface 62 can be flat, can be a convex surface 62' or can be a concave surface 62" as desired. The shape of the surface 62 is chosen to widen, narrow and/or direct the light beam. Preferably, the reflective image plane module 52 is injection molded as an integral unit. Again, the reflective image plane module 52 generally only includes the light directing and reflecting structures, here the prism 56 and the wafer based active matrix 46.

Figure 5A:
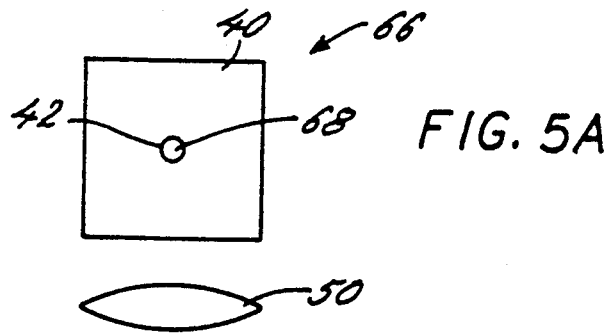
FIGS. 5A, 5B and 5C are diagrammatic top, front and side views of another reflective image plane module embodiment of the present invention.
Figure 5B:
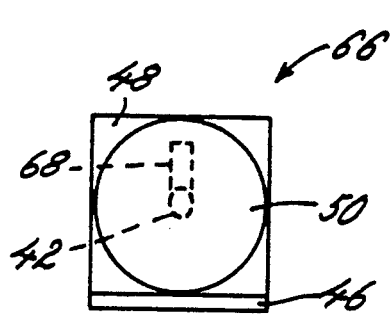
Figure 5C:
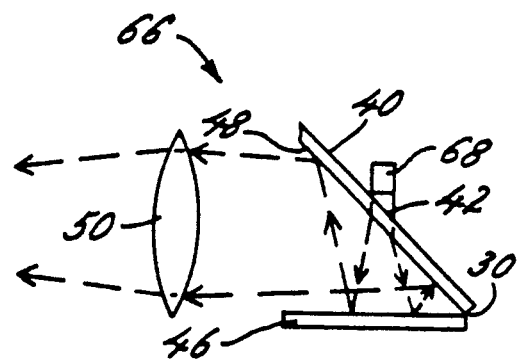

A third embodiment of a reflective image plane module of the present invention is best illustrated in FIGs. 5A-5C and is designated generally by the reference numeral 66. The focused light beam utilizing the lens 34 and 36 would collect the most light, but the lens system encompasses a fairly large amount of space. The reflective image plane module 66 provides a very compact unit by eliminating the lens 34 and 36. A light source 68, such as a bulb, is mounted directly into the aperture 42 of the wall 40 of the reflective image plane module 66, which otherwise operates the same as the reflective image plane module 30. The light is reflected from the wafer based active matrix 46 to the mirror surface 48 to the lens 50. This is not the most energy efficient embodiment and if utilized in a color system, the light from the bulb 68 would be passed through the appropriate filter to provide the red, green or blue color component.

Again, the light 68 and lens 50 generally would not form part of the reflective image plane module 66.

Figure 6A:
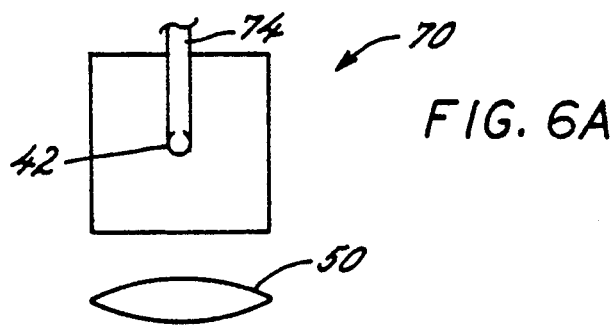
FIGS. 6A, 6B and 6C are diagrammatic top, front and side views of a further reflective image plane module embodiment of the present invention.
Figure 6B:
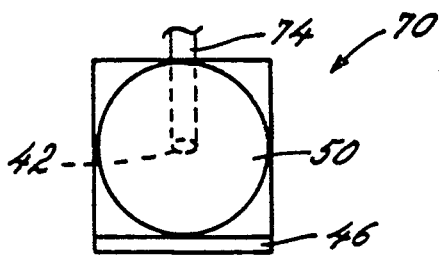
Figure 6C:
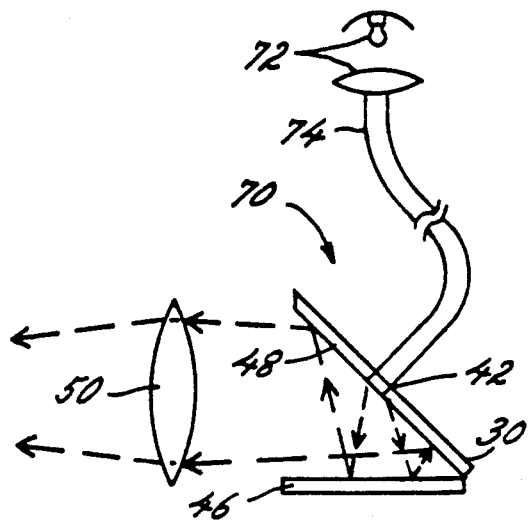

A further embodiment of a reflective image plane module of the present invention is best illustrated in FIGS. 6A-6C and is designated generally by the reference numeral 70. The reflective image plane module 70 is somewhat of a compromise between the reflective image plane module 30 and 66. A light source 72 is coupled into a fiber optic light guide or tube 74, which directs the light into the reflective image plane module 70 through the aperture 42, where it is acted upon like the reflective image plane module 30. The guide 74 gathers more light than utilizing the bulb 68, but encompasses more space than the bulb 68. The light guide 74 is more flexible and occupies less space than the lens system 34, 36.

Figure 7A:
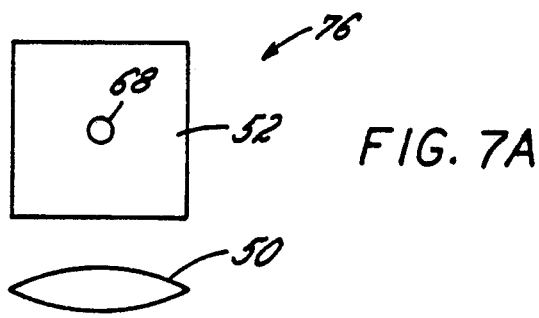
FIGS. 7A, 7B and 7C are diagrammatic top, front and side views of yet another reflective image plane module embodiment of the present invention.
Figure 7B:
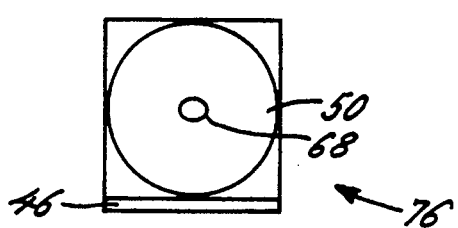
Figure 7C:
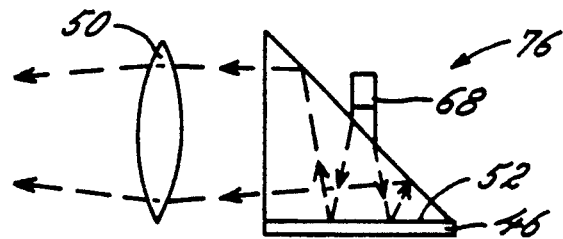

The bulb 68 can be utilized with the prism type reflective image plane module 52, as best illustrated in FIGS. 7A-7C, forming another reflective image plane module embodiment of the present invention which is designated generally by the reference numeral 76. The operation of the reflective image plane module 76 is generally the same as the reflective image plane module 52, once the light is introduced to the reflective image plane module 76.

Figure 8A:
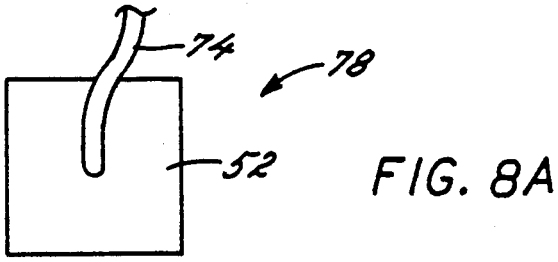
FIGS. 8A, 8B and 8C are diagrammatic top, front and side views of a still further reflective image plane module embodiment of the present invention.
Figure 8B:
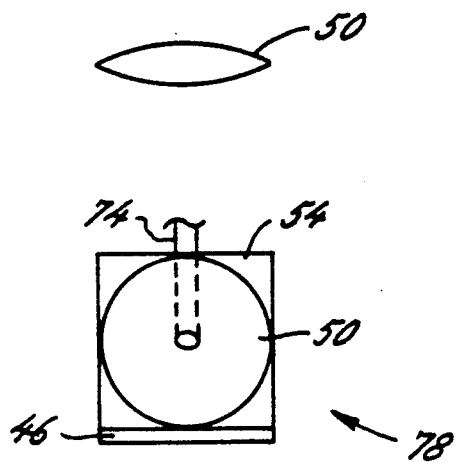
Figure 8C:
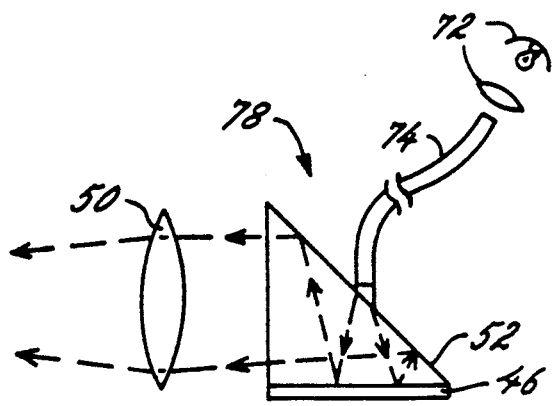

The light guide 74 also can be utilized with the prism type reflective image plane module 52, as best illustrated in FIGS. 8A-8C, forming a further reflective image plane module embodiment of the present invention which is designated generally by the reference numeral 78. Again, the operation of the reflective image plane module 78 is generally the same as the reflective image plane module 52, once the light is introduced to the reflective image plane module 78.

Figure 9:
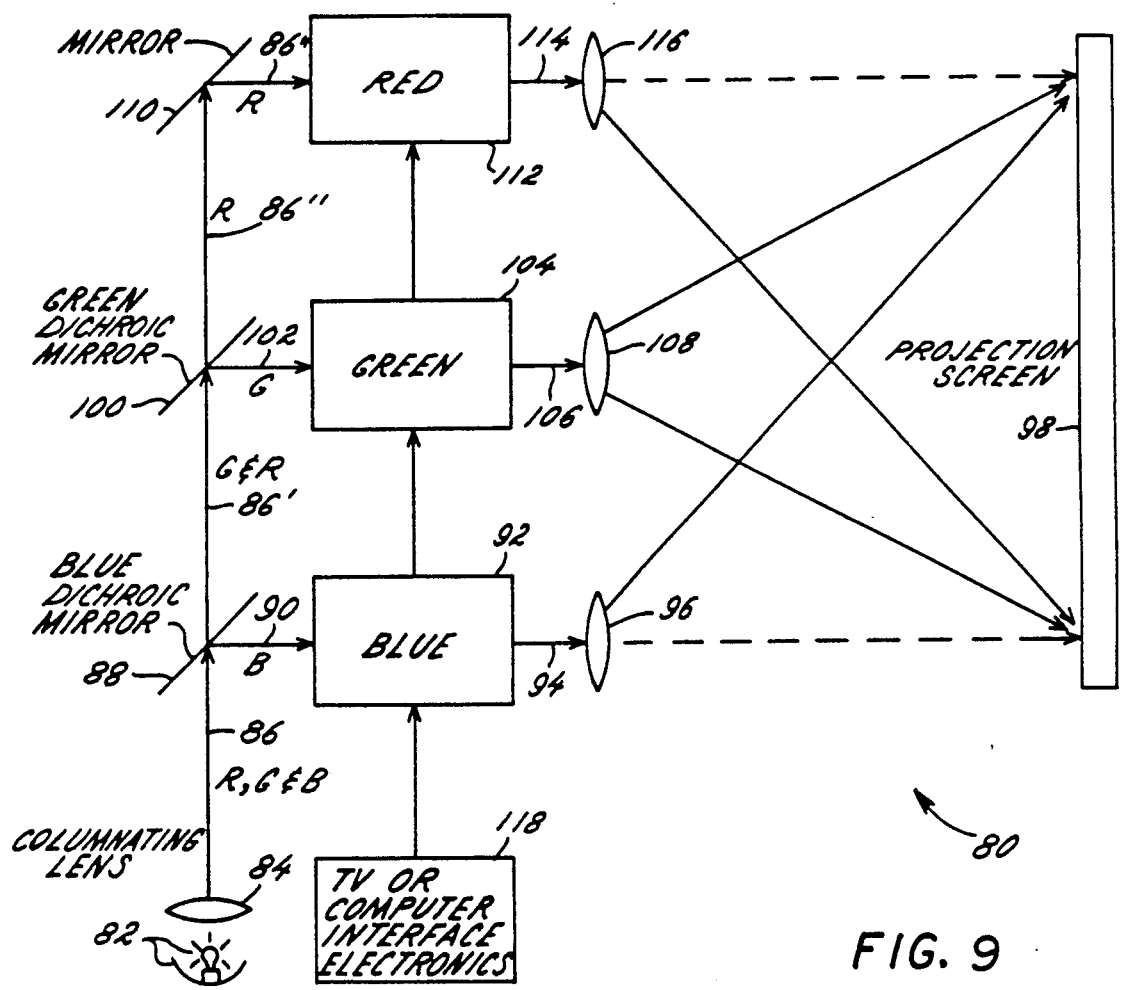
FIG. 9 is a diagrammatic side view of one projection system embodiment of the present invention.

Each of the above reflective image plane modules can be utilized as part of a monochrome projection system or can form one reflective image plane module of a three lens color projection system embodiment of the present invention, for example, as illustrated in FIG. 9 and which is designated generally by the reference character 80. The projection system 80 includes a light source 82, such as a bulb and reflector, from which light is directed through a columnating lens or lens system 84 to form a beam of light 86. The light beam 86 includes all three light components red, blue and green (hereinafter R, B and G).

The beam 86 is directed to a B dichroic mirror 88. The B light component 90 is reflected from the mirror 88 to a B reflective image plane module 92. The B reflective image plane module 92 can be any of the above-described reflective image plane modules 30, 52, 70 and 78. The encoded B light 94 is reflected from the B reflective image plane module 92 to a lens 96 and projected by the lens 96, to a screen 98, where it is combined with the other components to form a color image.

A light beam 86' passes through the mirror 88 with the G & R light components therein. The light beam 86' is directed to a G dichroic mirror 100. The G light component 102 is reflected from the mirror 100 to a G reflective image plane module 104. The encoded G light 106 is reflected from the G reflective image plane module 104 to a lens 108 and projected by the lens 108 to the screen 98.

A light beam 86" passes through the mirror 100 with only the R component therein. The beam 86" is directed to a mirror 110 and reflected therefrom to a R reflective image plane module 112. The encoded R light 114 is reflected from the R reflective image plane module 112 to a lens 116 and projected by the lens 116 to the screen 98. The information encoding is provided by an electronic interface 118 coupled to the reflective image plane modules 92, 104 and 112.

Figure 10:
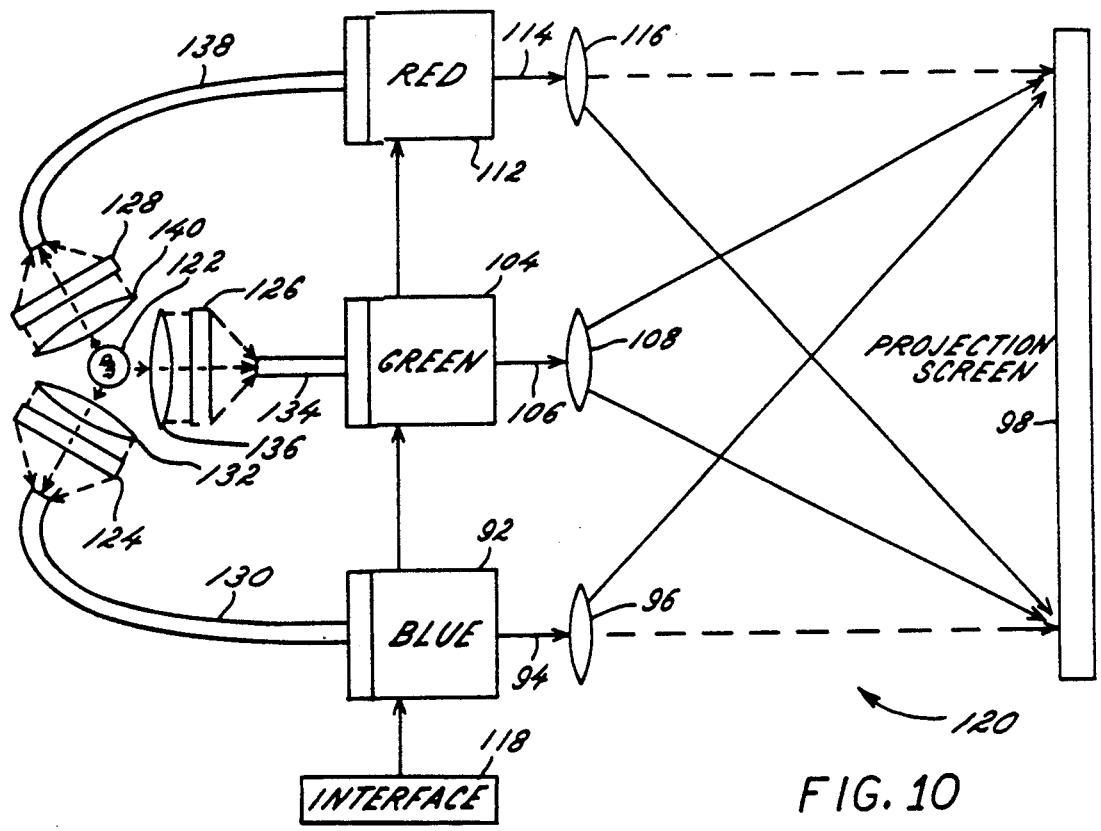
FIG. 10 is a diagrammatic side view of a second projection system embodiment of the present invention.

A second three lens projection system embodiment of the present invention is best illustrated in FIG. 10 and is designated generally by the reference numeral 120. The same or equivalent elements of the projection system 120 and succeeding systems utilize the same reference numerals as the system 80. the projection system 120 again has three reflective image plane modules 92, 104 and 112 which impart the information onto the three B, G and R light components projected onto the screen 98.

The projection system 120 again has a single light source, light 122; however, the B, G and R light components are derived by utilizing respective B, G, and R light filters 124, 126 and 128. The B light is coupled into a B filter optic light guide 130 by a condenser lens 132 and directed to the B reflective image plane module 92. In a like manner, the G light is coupled with a G light guide 134 by a condenser lens 136 and directed to the G reflective image plane module 104. The R light is coupled into an R light guide 138 by a condenser lens 140 and directed to the R reflective image plane module 12. The operation of the projection system 120 is otherwise identical to the operation of system 80.

Figure 11:
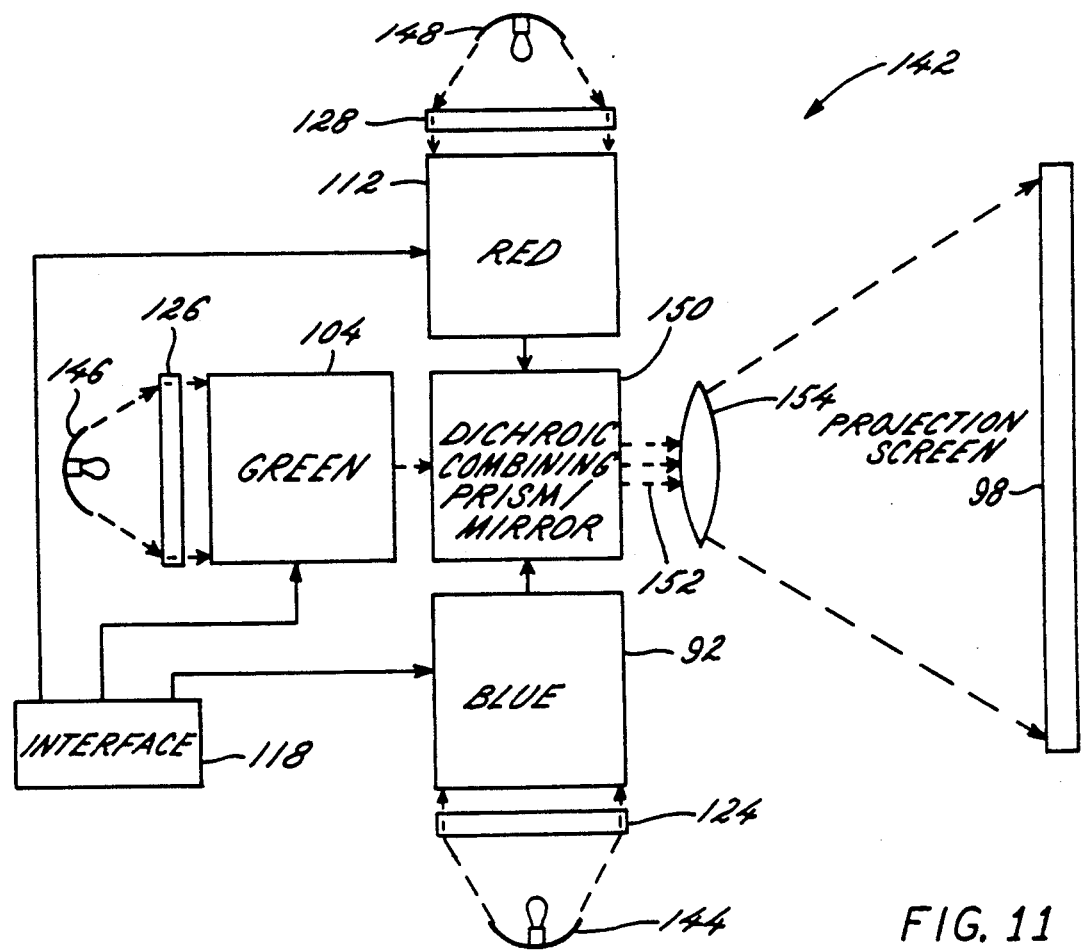
FIG. 11 is a diagrammatic side view of a further projection system embodiment of the present invention.

An embodiment of a single lens projection system is best illustrated in FIG. 11 and is generally designated by the reference character 142. The color projection system 142 again includes the three color reflective image plane modules 92, 104 and 112, but each reflective image plane module now includes its own light source 144, 146 and 148. The separate light sources again require the respective B, G and R filters 124, 126 and 128 to provide the B, G and R light components. The encoded B, G and R light components are each directed to a respective dichroic prism section of a conventional dichroic combining prism 150. The combining prism 150 combines the three B, G and R light components and outputs a single combined and encoded color signal 152, which is directed to a lens or lens system 154 and then is projected onto the screen 98.

Figure 12:
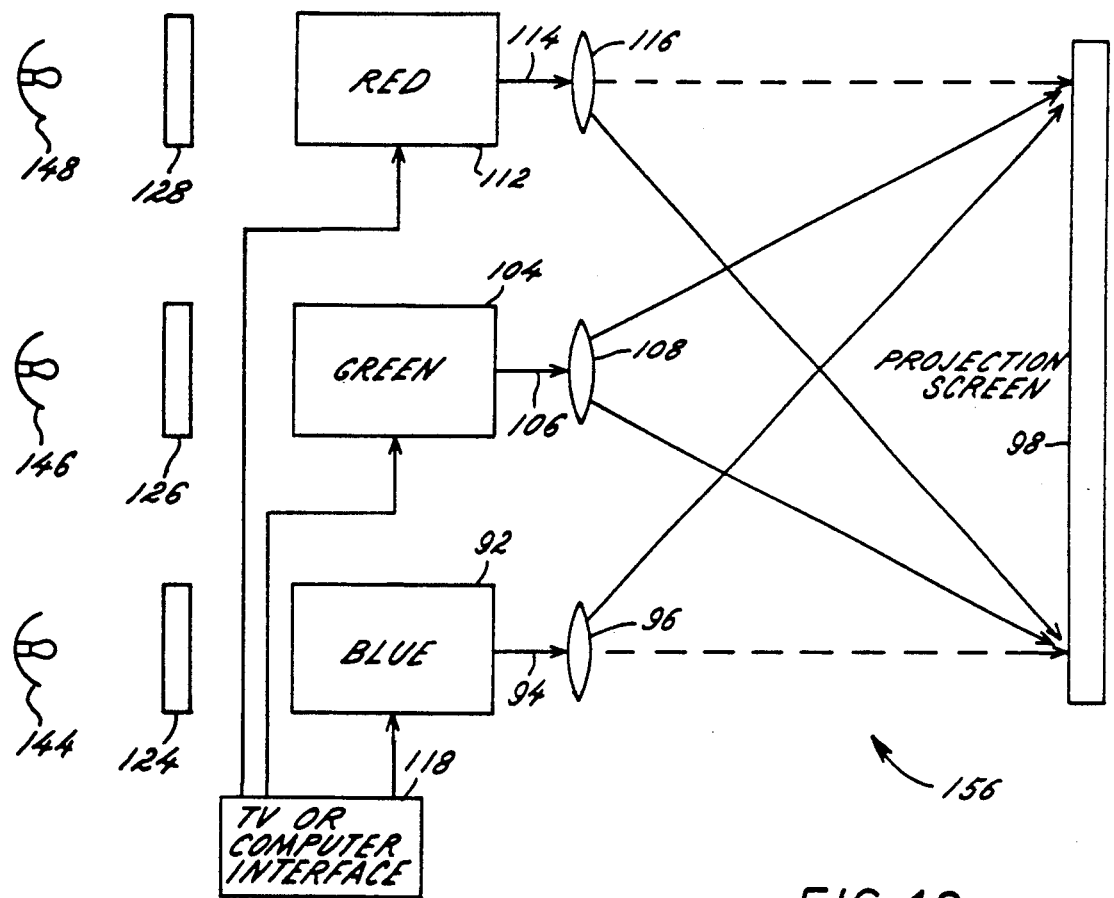
FIG. 12 is a diagrammatic side view of another projection system embodiment of the present invention.

A non-complex, three lens projection system combines elements from the other projection systems, and is best illustrated in FIG. 12 and is designated generally by the reference character 156. The projection system 156 includes the three separate light sources 144, 146 and 148 and the respective B, G and R filters 124, 126 and 128, which direct the light components to the respective reflective image plane modules 92, 104 and 112. The separate output components 94, 106, 114 then are directed to the respective lens 96, 108 and 116 for projection and combining onto the screen 98.

Figure 13:
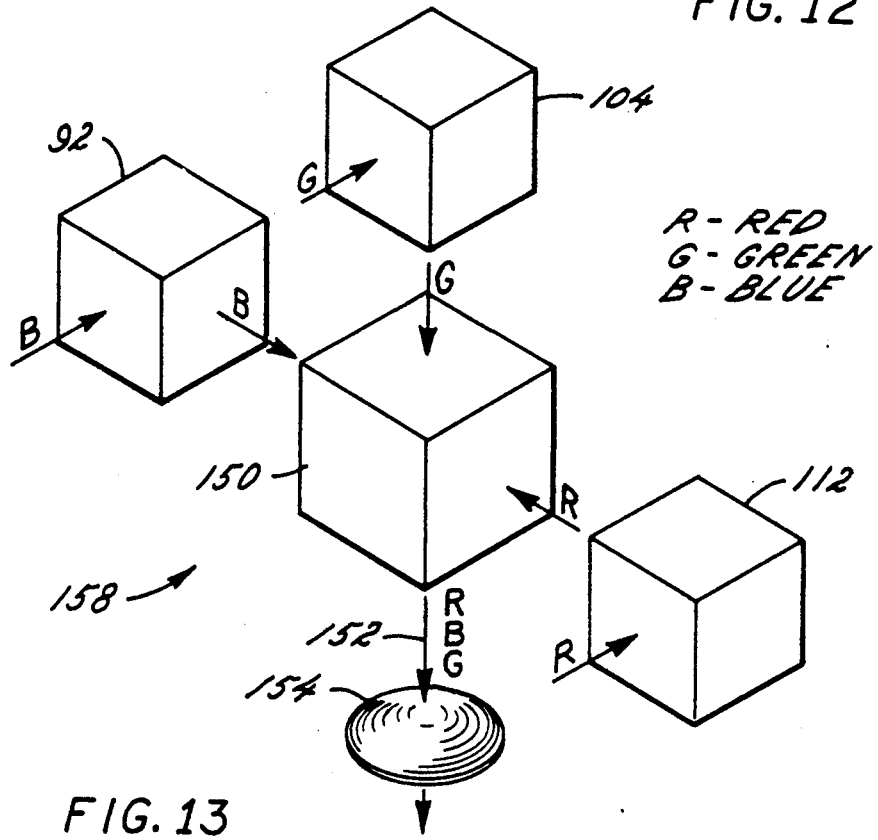
FIG. 13 is a perspective diagrammatic view of a still further projection system embodiment of the present invention.

Another single lens projection system embodiment of the present invention is best illustrated in FIGS. 13–14C and is designated generally by the reference character 158. The output of the three B, G and R reflective image plane modules 92, 104 and 112 are combined in the combining prism 150 and output on the single signal 152 to the projector lens 154. A single light source 160 directs light to the B dichroic mirror 88 which directs the B light component to the B reflective image plane module 92. The G dichroic mirror 100 directs the G light component to a mirror 162 which then directs the G light component to the G reflective image plane module 104. The R light component is directed to the R reflective image plane module 112 by the mirror 110.

Figure 15:
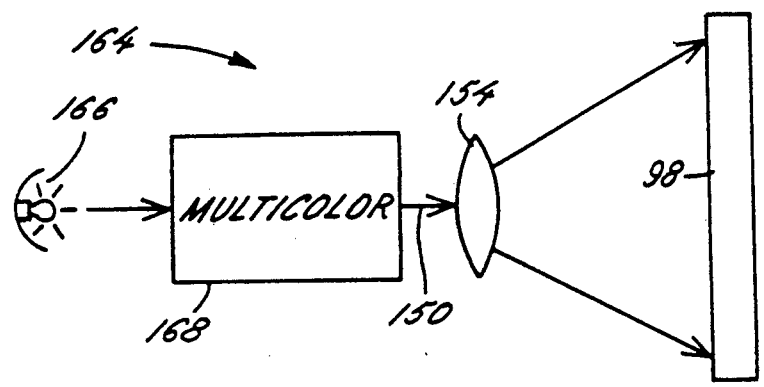
FIG. 15 is a diagrammatic side view of yet another projection system embodiment of the present invention.

Referring now to FIG. 15 an embodiment of a single imaging, single lens projection system of the present invention is best illustrated and is designated generally by the reference numeral 164. A light source 166, of any of the above referenced types, provides light to a multicolor reflective image plane module 168. In this configuration, only one reflective image plane module is utilized with one wafer based active matrix; however, the wafer based active matrix includes a mosaic or other type of color filter array integral therewith. This configuration would not currently be the most desirable, because three monochrome reflective image plane modules would triple the resolution on the screen 98 and would absorb much less heat than the single reflective image plane module 168.

Modifications and variations of the present invention are possible in light of the above teachings. The projection system light source could be any suitable type of light source, such as xenon metal halide or quartz-halogen lights for example. The projection systems have been described, for example purposes, as front screen projection systems, but also could be rear screen configurations or utilize fiber optic expanders, where the light is projected onto an end of a fiber optic bundle. The reflective image plane modules can be formed separately or can be formed integrally connected together to form a full color module. It is therefore to be understood that within the scope of the appended claims, the invention may be practiced otherwise than as specifically described.

What is claimed and desired to be secured by Letters Patent of the United States is:

1. A projector system, comprising:
   at least one source of light;
   means for directing light from said light source to at least one reflective imaging means including a wafer based active matrix for forming a reflected light beam and for imparting information onto said reflected light beam;
   said wafer being a non light transmissive single crystal wafer substrate with said active matrix formed on one surface of said wafer; and
   at least one means for projecting said reflected light beam for viewing.

2. The projector system as defined in claim 1 wherein said reflective imaging means include a mirror with an aperture therein for directing said light through to said wafer based active matrix and said mirror forming at least a portion of said projecting means.

3. The projector system as defined in claim 2 wherein said projecting means further include projecting lens means.

4. The projector system as defined in claim 2 wherein said directing means include a lens system for columnating said light from said light source and focusing said light through said aperture.

5. The projector system as defined in claim 2 wherein said light source is mounted into said aperture for directing said light to said reflective imaging means.

6. The projector system as defined in claim 2 wherein said directing means include fiber optic light guide means coupling said light from said light source to said aperture.

7. The projector system as defined in claim 1 wherein said reflective imaging means include a prism with a light receiving projection forming said light directing means and said prism forming at least a portion of said projecting means.

8. The projector system as defined in claim 7 wherein said projecting means further include projecting lens means.

9. The projector system as defined in claim 7 wherein said directing means include a lens system for columnating said light from said light source and focusing said light through said projection.

10. The projector system as defined in claim 7 wherein said light source is mounted onto said projection.

11. The projector system as defined in claim 7 wherein said directing means include fiber optic light guide means coupling said light from said light source to said projection.

12. The projector system as defined in claim 7 wherein said projection has a light receiving surface shaped to direct said light.

13. The projector system as defined in claim 1 including one reflective imaging means for each of the blue, green and red light components and means for forming and directing said components to said respective reflective imaging means for encoding.

14. The projector system as defined in claim 13 wherein said light component forming means include two dichroic mirrors for forming and directing said three components.

15. The projector system as defined in claim 13 wherein said light component forming means include respective filters and respective fiber optic light guide means for forming and directing said three components.

16. The projector system as defined in claim 13 including means for combining each encoded component into a single beam prior to projecting for viewing.

17. The projector system as defined in claim 13 including separate projecting means for each encoded component.

18. The projector system as defined in claim 13 including a separate source of light for each of said reflective imaging means and filter means for forming each of said components from its respective light source.

19. The projector system as defined in claim 18 including means for combining each encoded component into a single beam prior to projecting for viewing.

20. The projector system as defined in claim 18 including separate projecting means for each encoded component.

21. The projector system as defined in claim 1 wherein said wafer based active matrix includes a color filter array for forming a reflected color light beam.

22. The projector system as defined in claim 1 including an LCD material formed on said active matrix, said LCD material formed from a solid light modulating material having bodies of LC material suspended therein.

23. A projector system, comprising:
a source of light;
means for forming separate blue, green and red light components from said source of light;
separate reflective imaging means for each said light component, each reflective imaging means including a wafer based active matrix for forming a reflected component light beam and for imparting information onto said reflected component light beam;
said wafer being a non light transmissive single crystal wafer substrate with said active matrix formed on one surface of said wafer;
means for directing each of said light components to its respective reflective imaging means; and
at least one means for projecting each of said reflected component light beams for viewing.

24. The projector system as defined in claim 23 wherein each said reflective imaging means include a mirror with an aperture therein for directing said light component through to said wafer based active matrix and said mirror forming at least a portion of said projecting means.

25. The projector system as defined in claim 24 wherein each said projecting means further include projecting lens means.

26. The projector system as defined in claim 24 wherein said directing means include a lens system for columnating each said light component from said light component forming means and focusing said light component through said aperture.

27. The projector system as defined in claim 24 wherein said light component forming means include respective filters, each said respective filter mounted into said aperture for focusing and directing each said light component to said reflective imaging means.

28. The projector system as defined in claim 24 wherein said directing means include fiber optic light guide means coupling each said light component from said respective light component forming means to said aperture.

29. The projector system as defined in claim 23 wherein each said reflective imaging means include a prism with a light receiving projection forming said light component directing means and said prism forming at least a portion of said projecting means.

30. The projector system as defined in claim 28 wherein each said projecting means further include projecting lens means.

31. The projector system as defined in claim 29 wherein said directing means include a lens system for columnating each said light component from said light forming means and focusing said light component through said projection.

32. The projector system as defined in claim 29 wherein said light component forming means include respective filters, each said respective filter mounted onto said projection.

33. The projector system as defined in claim 29 wherein said directing means include fiber optic light guide means coupling each said light component from said respective light component forming means to said projection.

34. The projector system as defined in claim 29 wherein each said projection has a light receiving surface shaped to direct said light component.

35. The projector system as defined in claim 23 wherein said light component forming means include two dichroic mirrors for forming and directing said three components.

36. The projector system as defined in claim 23 wherein said light component forming means include respective filters and respective fiber optic light guide means for forming and directing said three components.

37. The projector system as defined in claim 23 including means for combining each encoded component into a single beam prior to projecting for viewing.

38. The projector system as defined in claim 23 including separate projecting means for each encoded component.

39. The projector system as defined in claim 23 including an LCD material formed on said active matrix, said LCD material formed from a solid light modulating material having bodies of LC material suspended therein.

40. A projector system, comprising:
three sources of light and means for forming separate blue, green and red light components from said three sources of light;
separate reflective imaging means for each said light component, each reflective imaging means including a wafer based active matrix for forming a reflected component light beam and for forming a reflected component light beam and for imparting information onto said reflected component light beam;
said wafer being a non light transmissive single crystal wafer substrate with said active matrix formed on one surface of said wafer;
means for directing each of said light components to its respective reflective imaging means; and
at least one means for projecting each of said reflected component light beams for viewing.

41. The projector system as defined in claim 40 wherein each said reflective imaging means include a mirror with an aperture therein for directing said light component through to said wafer based active matrix and said mirror forming at least a portion of said projecting means.

42. The projector system as defined in claim 41 wherein each said projecting means further include projecting lens means.

43. The projector system as defined in claim 41 wherein said directing means include a lens system for columnating each said light component from each said light component forming means and focusing said light component through said aperture.

44. The projector system as defined in claim 41 wherein said light component forming means include respective filters and wherein each said light source is mounted with said respective filter into said aperture for directing each said light component to said reflective imaging means.

45. The projector system as defined in claim 41 wherein said directing means include fiber optic light guide means coupling each said light component from said respective light component forming means to said aperture.

46. The projector system as defined in claim 40 wherein each said reflective imaging means include a prism with a light receiving projection forming said light component directing means and said prism forming at least a portion of said projecting means.

47. The projector system as defined in claim 46 wherein each said projecting means further include projecting lens means.

48. The projector system as defined in claim 46 wherein said directing means include a lens system for columnating each said light component from said light forming means and focusing said light component through said projection.

49. The projector system as defined in claim 46 wherein said light component forming means include respective filters and wherein each said light source is mounted with said respective filter onto said projection.

50. The projector system as defined in claim 46 wherein said directing means include fiber optic light guide means coupling each said light component from said respective light component forming means to said projection.

51. The projector system as defined in claim 46 wherein each said projection has a light receiving surface shaped to direct said light component.

52. The projector system as defined in claim 40 wherein said light component forming means include respective filters and respective fiber optic light guide means for forming and directing said three components.

53. The projector system as defined in claim 40 including means for combining each encoded component into a single beam prior to projecting for viewing.

54. The projector system as defined in claim 40 including separate projecting means for each encoded component.

55. The projector system as defined in claim 40 including an LCD material formed on said active matrix, said LCD material formed from a solid light modulating material having bodies of LC material suspended therein.

* * * * *